(No Model.)

F. F. OSBORNE.
BLOTTER BATH FOR COPYING PRESSES.

No. 472,681. Patented Apr. 12, 1892.

Attest
Walter Malater
William Hall

Inventor
Frank F. Osborne
by Ellis Spear
A. W. Williams
Attys

UNITED STATES PATENT OFFICE.

FRANK F. OSBORNE, OF SHARPSVILLE, PENNSYLVANIA.

BLOTTER-BATH FOR COPYING-PRESSES.

SPECIFICATION forming part of Letters Patent No. 472,681, dated April 12, 1892.

Application filed December 14, 1891. Serial No. 414,919. (No model.)

*To all whom it may concern:*

Be it known that I, FRANK F. OSBORNE, a citizen of the United States of America, residing at Sharpsville, in the county of Mercer and State of Pennsylvania, have invented certain new and useful Improvements in Blotter-Baths for Copying-Presses, of which the following is a specification.

It is the object of my invention to provide a blotter-bath by which the amount of dampness imparted to the blotters may be determined and regulated to suit the amount of work the blotters are to be used for.

My object also is to provide a blotter-bath which will hold a considerable quantity of water and will prevent the evaporation thereof.

My invention includes a casing having a damping-stone therein and means by which the height of the water in the bath may be observed and regulated. It includes the casing having an enlarged base and a contracted upper portion, a stone fitted to the contracted upper portion and resting upon the base, whereby a water-chamber is formed about the stone, an opening in the enlarged part of the casing, and graduations on the stone and within sight through said opening, by which the amount of water in the bath may be regulated.

Other features of the invention will be pointed out hereinafter.

Figure 1:
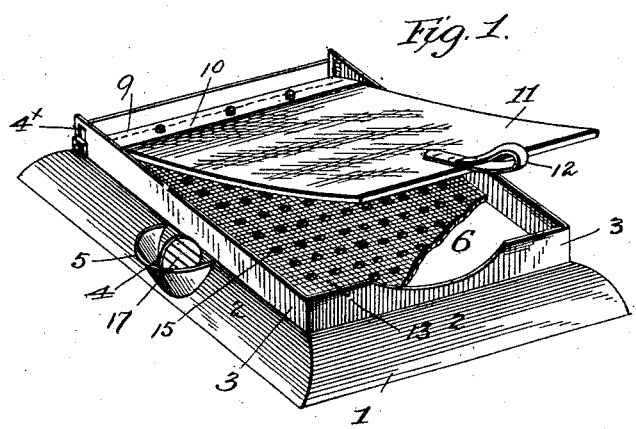
Figure 2:
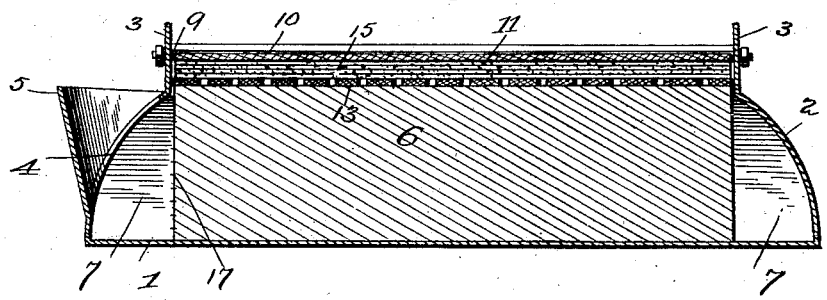

In the accompanying drawings, Figure 1 is a perspective view, and Fig. 2 a section taken vertically.

In the drawings the casing of the bath is formed of a base 1, the sides 2, and the upper rim 3. The sides are curved and slope inwardly, forming a contracted upper part, of which the rim 3 is a continuation. In one of the inclined sides an opening 4 is formed, and about this opening a rim or funnel 5 extends, opening upwardly. The damping-block 6 is formed of stone or other absorbent material, and it is of such size as to fit within the contracted upper part of the casing. Its height is such as to permit it to rest upon the base, while its upper edge will be slightly above the lower inner edge of the rim 3, which thus acts to confine the block in place and prevent lateral displacement. The walls of the block are vertical, and there is thus formed a water-chamber 7 about the block in the broadened part of the base. The opening 4 in the base is so formed that a clear view of the side of the block is permitted, and by reason of this the height of the water up the side of the block can be readily seen. For the purpose of accurately determining this height and thus gaging the amount of water accurately to the desired amount of saturation in the stone the side of the stone is provided with graduations 17, extending horizontally and across the line of the opening. By this means the amount of water necessary to dampen blotters—say for twenty-five letters—can be accurately determined by slight experiment and experience.

The casing is preferably made of sheet metal, and at one end the rim 3 has vertical slots $4^\times$, which receive the ends of the bar 9. This is threaded and has nuts to hold the bar properly, but allow it free vertical movement. The bar has a flange 10, and riveted to this is a flexible cover or flap 11 of rubber or similar non-absorbent material having a thumb-loop 12 at its front end. The casing is cut away to permit the blotters or pads to be easy of access.

On the stove is placed a perforated sheet 13 of rubber or like material, and on this sheet the blotters are placed, and the cover or flap is brought down upon the whole, the slots $4^\times$ allowing the cover at its hinges to accommodate itself to different quantities of blotters or pads. The moisture from the stone is absorbed by the blotters and is distributed thereto through the perforations 15 in the rubber sheet 13. By this arrangement the moisture is evenly distributed and the amount regulated to a nicety. The opening in the inclined side may be closed by a suitable stopper. The stone, as before stated, fills the upper contracted part, and when the flexible covering is down it will be seen that there is little chance for evaporation of the water. Should it be desired to have more weight than that afforded by the flexible covering, a metallic covering-plate may be used, or a suitable weight may be used in connection with the flexible covering shown.

What I claim is—

1. In combination, the casing, the absorbent stone therein, the perforated sheet of non-absorbent material on the stone, the flexible non-absorbent cover, and the adjustable connections between the same and the casing.

2. In combination, the casing having the base with the inclined sides and the contracted upper part continued into a rim 3, the stone fitting within the rim and confined thereby, forming a water-space around the base, and the rim about the same, substantially as described.

3. In combination, the casing having the base with the inclined sides, the contracted upper part continued into a rim 3, one of the said inclined sides having the opening therein, and the stone having the graduated marks thereon across the line of said opening, substantially as described.

In testimony whereof I affix my signature in presence of two witnesses.

FRANK F. OSBORNE.

Witnesses:
   A. W. WILLIAMS,
   G. W. SHILLING.